United States Patent
Sanchez et al.

(10) Patent No.: US 11,881,204 B2
(45) Date of Patent: Jan. 23, 2024

(54) DUAL-TONE HORN ASSEMBLIES AND METHODS OF USE

(71) Applicant: Ford Global Technologies, LLC, Dearborn, MI (US)

(72) Inventors: Marco Sanchez, Mexico City (MX); Beatriz Barrios, Mexico City (MX); J Elias Ruiz, Atizapan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 846 days.

(21) Appl. No.: 16/943,589

(22) Filed: Jul. 30, 2020

(65) Prior Publication Data

US 2022/0036870 A1  Feb. 3, 2022

(51) Int. Cl.
*G10K 9/02* (2006.01)
*G10K 13/00* (2006.01)
*B60Q 5/00* (2006.01)

(52) U.S. Cl.
CPC .............. *G10K 9/02* (2013.01); *B60Q 5/001* (2013.01); *G10K 13/00* (2013.01)

(58) Field of Classification Search
CPC ............ G10K 9/02; G10K 13/00; G10K 9/12; G10K 9/20; B60Q 5/001; B60Q 5/00
See application file for complete search history.

(56) References Cited

U.S. PATENT DOCUMENTS

| | | | | |
|---|---|---|---|---|
| 1,890,719 A | * | 12/1932 | Busch | G10K 11/025 181/189 |
| 2,160,166 A | * | 5/1939 | Pausin | G10K 11/025 181/190 |
| 2,351,690 A | | 6/1944 | Oliver | |
| 3,477,405 A | * | 11/1969 | Jensen | G10K 11/28 340/390.1 |

(Continued)

FOREIGN PATENT DOCUMENTS

CN  202524555 U  11/2012

OTHER PUBLICATIONS

CN-103531194-B; Bechtold, "Electric Horn Device And Traffic Transportation Tool For Traffic Transportation Tool", Nov. 2017 (Year: 2017).*

(Continued)

*Primary Examiner* — John Fitzgerald
*Assistant Examiner* — Tania Courson
(74) *Attorney, Agent, or Firm* — Frank Lollo; Eversheds Sutherland (US) LLP

(57) ABSTRACT

Dual-tone horn assemblies and methods of use are disclosed herein. An example dual scroll assembly includes a nozzle having a first portion of the nozzle has a first diameter and a second portion of the nozzle has a second diameter that has a size that is different from the first diameter, a first spiraled channel that receives air from the first portion of the nozzle. The air traveling through the first spiraled channel produces a first tone at a first frequency. A divider plate is disposed (Continued)

between the first spiraled channel and a second spiraled channel. The second spiraled channel receives the air from the second portion of the nozzle. The air traveling through the second spiraled channel produces a second tone at a second frequency. The first tone and the second tone when produced simultaneously create a dyad.

18 Claims, 5 Drawing Sheets

(56) References Cited

U.S. PATENT DOCUMENTS

| | | | |
|---|---|---|---|
| 4,007,703 A | 2/1977 | Frigo | |
| 4,970,983 A | 11/1990 | Leblanc et al. | |
| 5,659,288 A * | 8/1997 | Liu | G10K 9/13 |
| | | | 116/142 R |
| 5,751,827 A * | 5/1998 | Takahashi | H04R 17/00 |
| | | | 381/191 |
| 6,648,098 B2 * | 11/2003 | Nichols | H04R 1/2857 |
| | | | 181/182 |
| 6,754,360 B2 * | 6/2004 | Granziera | G10K 9/20 |
| | | | 381/339 |
| 7,038,576 B2 * | 5/2006 | Di Giovanni | G10K 9/04 |
| | | | 116/139 |
| 7,284,638 B1 * | 10/2007 | Sahyoun | H04R 1/2857 |
| | | | 181/279 |
| 7,617,794 B2 * | 11/2009 | Chlystek | G10K 9/22 |
| | | | 381/340 |
| 8,155,363 B2 * | 4/2012 | Suzuki | G10K 9/20 |
| | | | 381/338 |
| 8,265,320 B2 * | 9/2012 | Datz | H04R 1/30 |
| | | | 381/342 |
| 9,024,736 B2 * | 5/2015 | Righetto | B60Q 5/00 |
| | | | 340/815.72 |
| 9,161,119 B2 * | 10/2015 | Powell | H04R 1/02 |
| 10,166,816 B2 * | 1/2019 | Ino | G10K 9/13 |
| 10,867,591 B1 * | 12/2020 | Hillenbrand | B60Q 5/00 |
| 2003/0136328 A1 * | 7/2003 | Granziera | G10K 9/20 |
| | | | 381/340 |
| 2003/0228021 A1 * | 12/2003 | Letinturier | B60R 25/104 |
| | | | 381/86 |
| 2008/0238043 A1 * | 10/2008 | Chlystek | G10K 9/22 |
| | | | 280/727 |
| 2014/0009272 A1 * | 1/2014 | Righetto | G10K 9/22 |
| | | | 340/404.1 |

OTHER PUBLICATIONS

"Electric Pump Air Horn, 12V Dual Tone Trumpet Super Loud Snail Electric Pump Siren for Car Truck Bike Motorcycle," Web page <https://www.amazon.com/Electric-Trumpet-Super-Snail-Motorcycle/dp/B06ZZYQSL4.html>, 7 pages, retrieved from the internet on Nov. 3, 2020.

"Stebel 11690019—Nautilus Compact Mini Air Horn Black—Walmart.com," Web page <https://www.walmart.com/ip/Stebel-11690019-Nautilus-Compact-Mini-Air-Horn-Black/164453903.html>, 9 pages, retrieved from the internet on Nov. 3, 2020.

"Bad Boy Air Horn—Save on this Bad Boy Air Horn at HFT," Web page <https://www.harborfreight.com/bad-boy-air-horn-94117.html?cid=paid_google|||94117&utm_medium_campaign+&utm_.html>, 6 pages, retrieved from the internet on Nov. 3, 2020.

* cited by examiner

DUAL-TONE HORN ASSEMBLIES AND METHODS OF USE

BACKGROUND

Many vehicles include horns or the like. A vehicle horn can include a membrane, scroll, and trumpet. The vehicle horn can also include an inlet cavity. Air produced by membrane vibrations can flow through the inlet cavity to produce a tone. This inlet channel has a fixed length which is dimensioned to match a frequency and the amplitude selected for each horn (e.g., low or high). While dual-horn assemblies exist, these designs are complex, have packaging constraints, increased weight, and increased cost—just to name a few.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to dual scroll horn assemblies and methods of use. The dual scroll horn can include an electro-mechanic device that produces two main tones through the use of a variable dimensioned (two-part) inlet or nozzle of a dual scroll assembly. The dual scroll horn produces a dyad, which is a combination of two tones played in combination. In some instances, the dual scroll assembly is enclosed in a single housing, and the dual scroll horn shares a common membrane and trumpet.

Illustrative Embodiments

Figure 1:
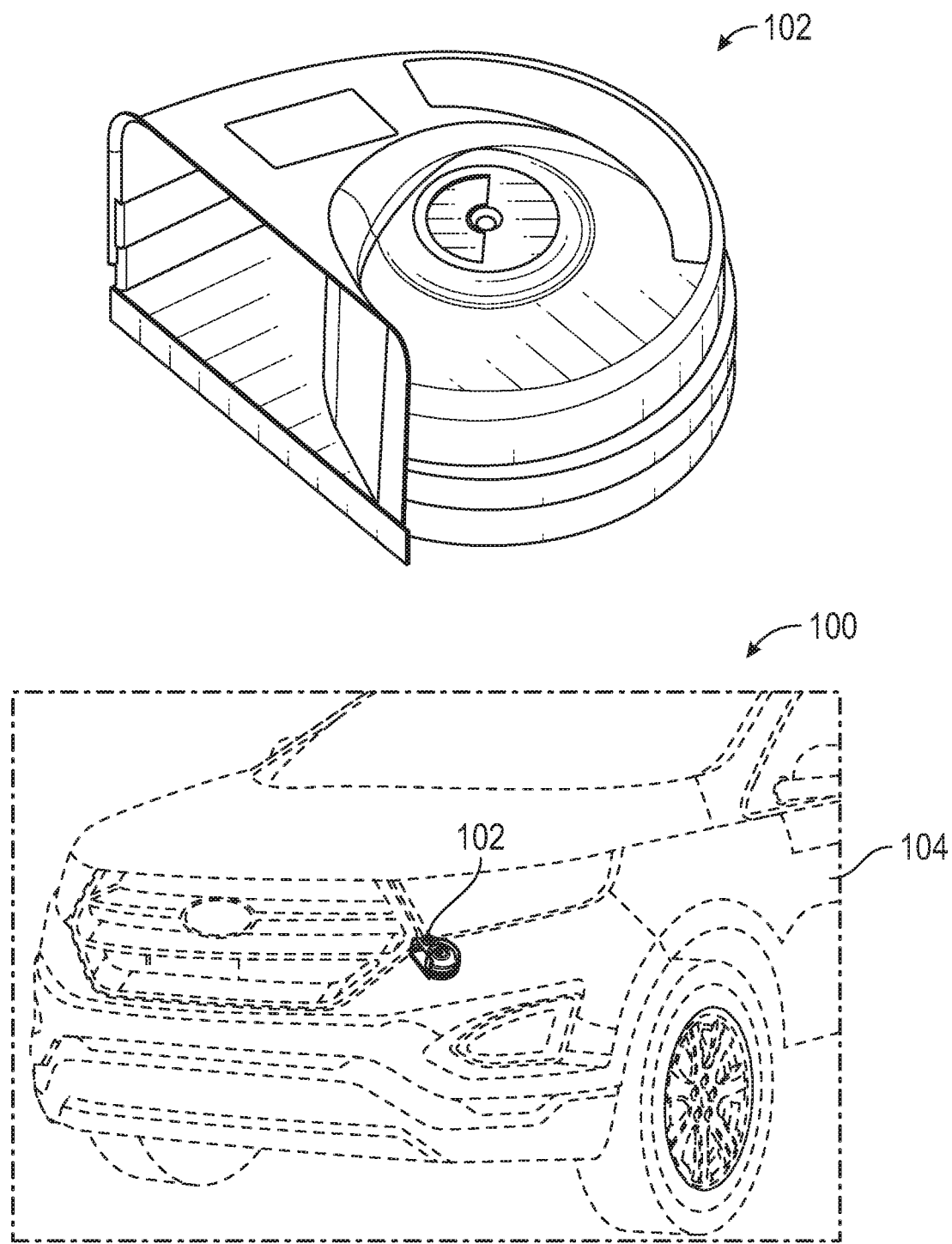
FIG. 1 depicts an illustrative architecture in which techniques and structures for providing the systems and methods disclosed herein may be implemented, namely an example dual-tone horn installed in a vehicle.

Turning now to the drawings, FIG. 1 depicts an illustrative architecture 100 in which techniques and structures of the present disclosure may be implemented. The architecture 100 can include a vehicle 104 having a dual scroll horn 102 of the present disclosure. The dual scroll horn 102 is configured to produce a dual-tone or dyad from two dual scroll assemblies included therein. The dual scroll horn 102 produces an aesthetically pleasing sound.

Figure 2:
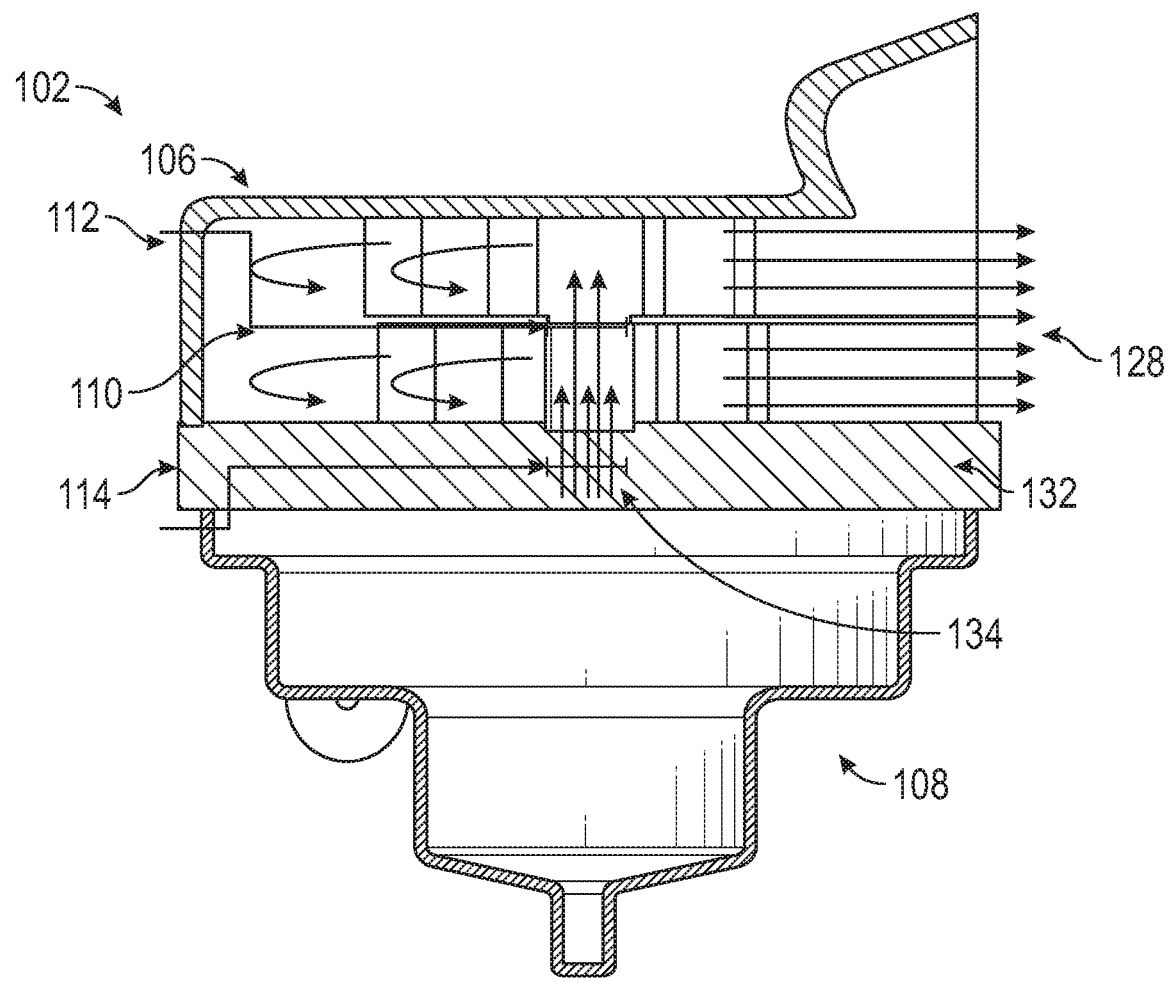
FIG. 2 is a cross-sectional view of an example dual-tone horn of the present disclosure.
Figure 3:
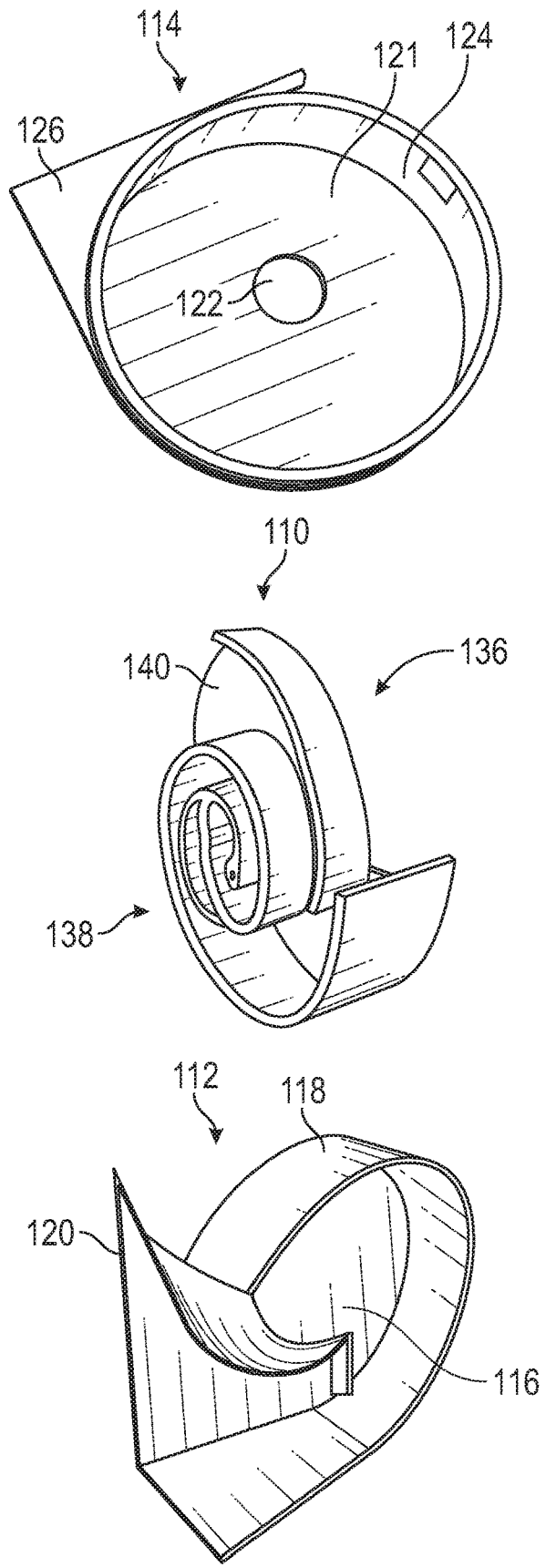
FIG. 3 is an exploded perspective view of an upper cover, a lower cover, and a dual scroll assembly of the example dual-tone horn of FIG. 2.

Referring to FIGS. 2 and 3, collectively, the dual scroll horn 102 can generally include a housing 106, a main membrane assembly 108, and a dual scroll assembly 110. The housing 106 can be configured as two members, namely an upper cover 112 and a lower cover 114. The upper cover 112 can include a top surface 116, an upper cover sidewall 118, and an upper cover trumpet section 120. The lower cover 114 can include a lower cover 121 having a lower cover port 122, a lower cover sidewall 124, and a lower cover trumpet section 126. When the upper cover 112 and the lower cover 114 are joined together, the upper cover trumpet section 120 and the lower cover trumpet section 126 form a trumpet 128. The upper cover 112 can cover an upper portion of the dual scroll assembly 110, while the lower cover 114 can be positioned to cover a top surface of the main membrane assembly 108. The lower cover port 122 allows a membrane 130 (see FIG. 7) of the main membrane assembly 108 to extend there through. The main membrane assembly 108 and the dual scroll assembly 110 can be spaced apart from one another to create a main plenum 132 that receives air 134 produced by the main membrane assembly 108.

Figure 6:
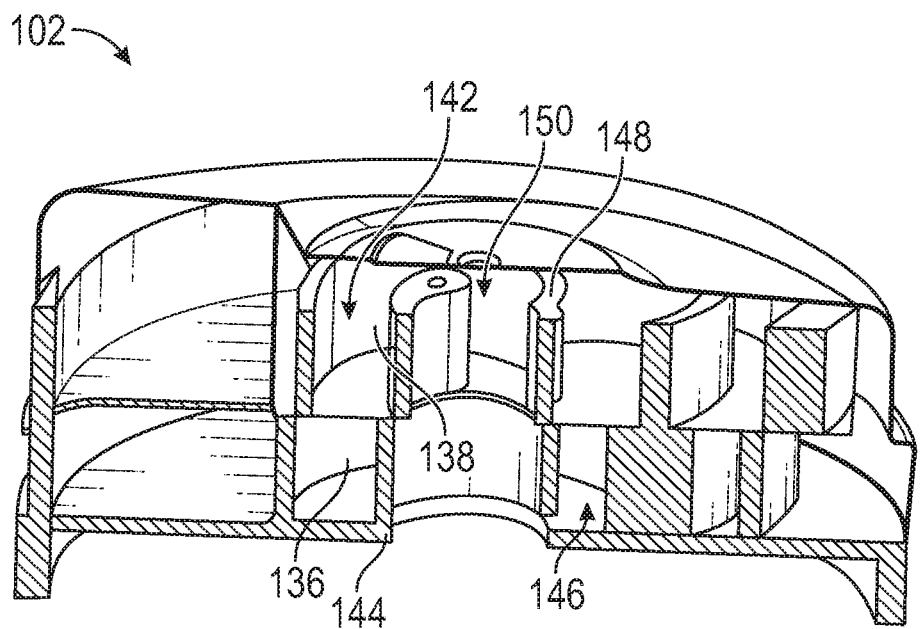
FIG. 6 is a cross-sectional view of a portion of example of a dual-tone horn of the present disclosure.

In general, air 134 driven by the main membrane assembly 108 can enter the dual scroll assembly 110 to produce a first tone at a first frequency and a second tone at a second frequency, creating a dyad as the air 134 exits the trumpet 128. Generally, the dual scroll assembly 110 includes a first scroll channel 136 and a second scroll channel 138 that are spaced apart from one another by a divider plate 140. Referring briefly to FIG. 6, the dual scroll assembly 110 includes a nozzle 142. The nozzle 142 can have two portions, each having different diameters relative to one another. Further aspects of the nozzle 142 are described below.

Figure 4:
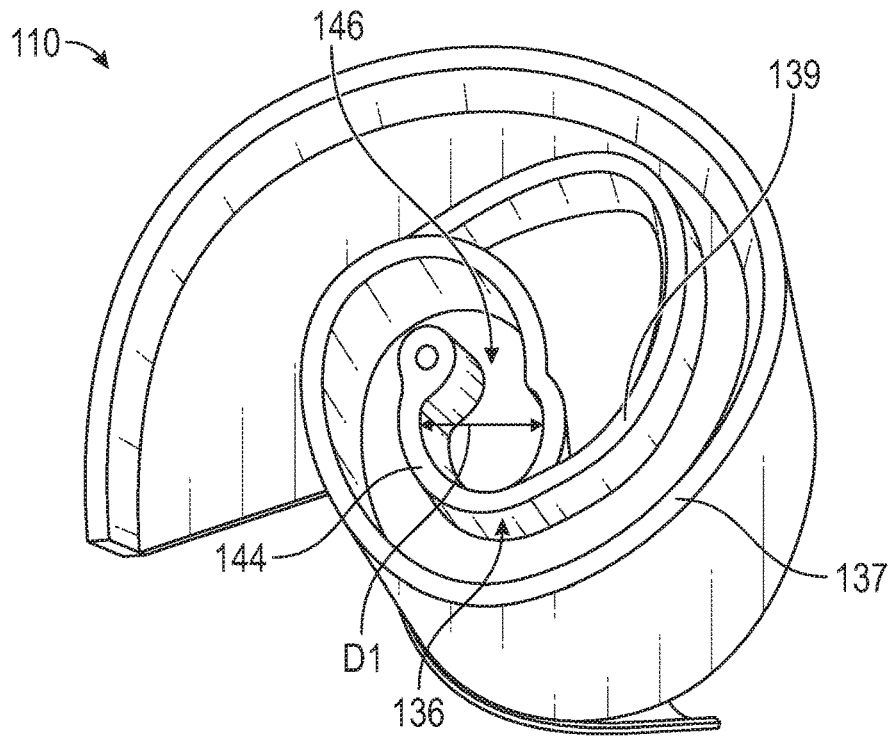
FIG. 4 illustrates an example of a dual scroll assembly of the example dual-tone horn, showing a first scroll channel.
Figure 5:
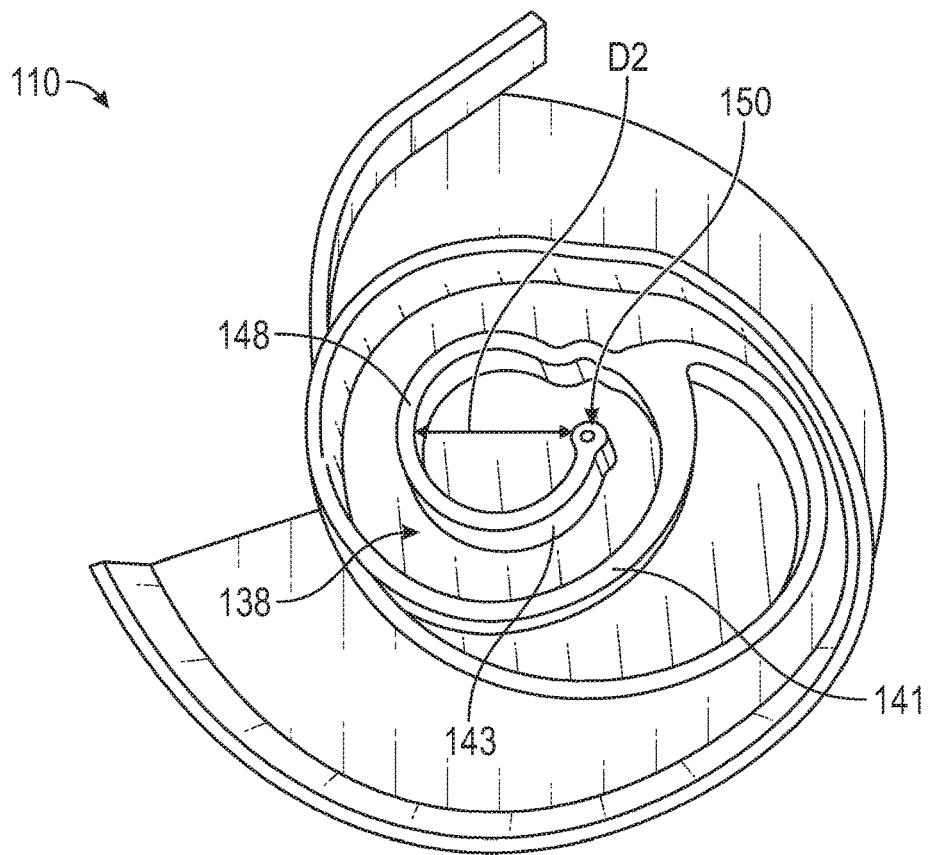
FIG. 5 illustrates an example of a dual scroll assembly of the example dual-tone horn, showing a second scroll channel.

FIG. 4 illustrates the first scroll channel 136 of the dual scroll assembly 110. The first scroll channel 136 is associated with a first portion 144 of the nozzle 142 (FIG. 6). The first portion 144 of the nozzle 142 can include a partial tubular collar with a first bypass 146 that diverts air into the first scroll channel 136. The first scroll channel 136 is defined by two spaced-apart sidewalls 137 and 139. FIG. 5 illustrates the second scroll channel 138 of the dual scroll assembly 110. The second scroll channel 138 is associated with a second portion 148 of the nozzle 142. The second portion 148 of the nozzle 142 can include a partial tubular collar with a second bypass 150 that diverts air into the second scroll channel 138. The second scroll channel 138 is defined by two spaced-apart sidewalls 141 and 143.

The diameter reduction of the second portion 146 relative to the first portion 144 helps to achieve a tone change. The arrangement may depend on a base tone provided by the membrane. The length of each scroll is relevant as well. For example, a longer scroll channel will produce a low tone, and the shorter one will produce a high tone. The inlet diameter reduction will further assist in producing a higher tone.

As noted above, a diameter D1 of the first portion 144 of the nozzle 142 is different from a diameter D2 of the second portion 148 of the nozzle 142. In some configurations, a ratio of the first diameter D1 and the second diameter D2 is about 4:5 or 5:4. Again, this ratio, in combination with the geometrical configurations of the first scroll channel 136 and the second scroll channel 138 produces the first frequency and the second frequency. The first frequency can be approximately 400 Hertz and the second frequency can be approximately 500 Hertz. In general, the frequency of a scroll channel is based on sound speed and length of the scroll channel. For example, if a desired frequency is 400 Hertz, the length required assuming a constant sound speed of about 340 meters per second is about 42.5 centimeters. If a desired frequency is 500 Hertz, the length required assuming a constant sound speed of about 340 meters per second is about 34 centimeters. Generally speaking, the longer the distance, the lower frequency of the tone that is produced, and the shorter the distance, the higher frequency of the tone that is produced. For example, if the base tone/fundamental membrane fundamental frequency was 500 Hz, the proportion is 4/5 on the first cavity, and the second cavity is one. If the membrane fundamental is 400 Hz, the proportion selected would be 5/4 for the first cavity, and the second cavity would be one.

The first or base frequency is produced by the main membrane assembly 108 in combination with the first scroll channel 136, while the second frequency is produced by the second scroll channel 138. The second frequency is further produced based on the dimensional difference between the second diameter D2 of the second portion 148 of the nozzle 142 relative to the diameter D1 of the first portion 144 of the nozzle 142. In some configurations, the dimensional change is founded on the Pythagorean Tuning method.

Figure 7:
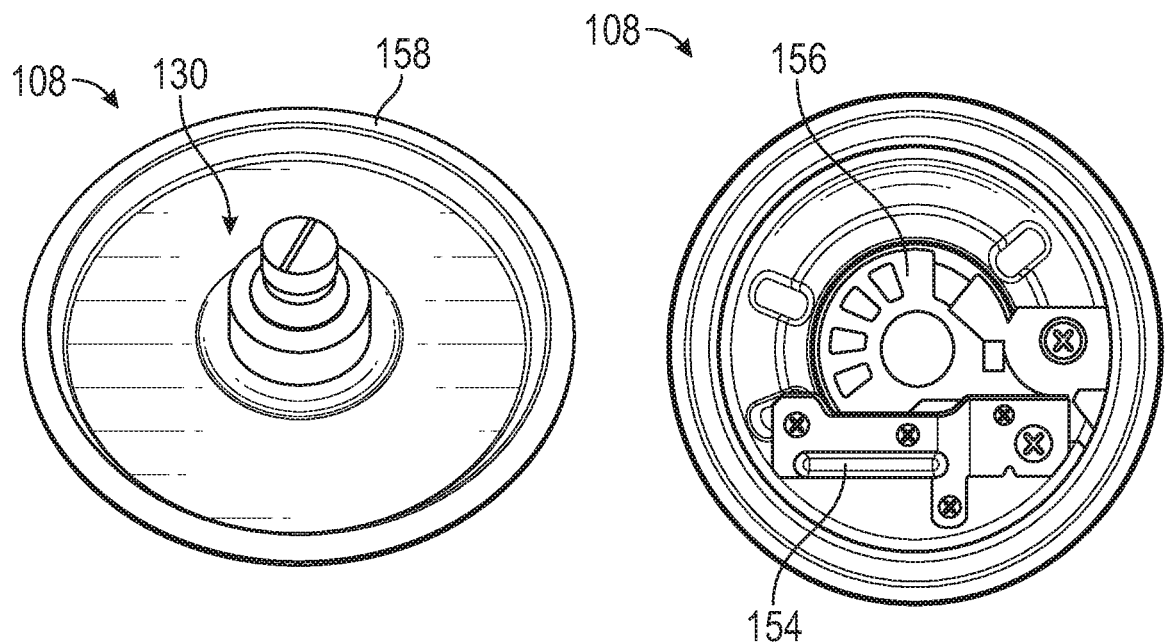
FIG. 7 includes perspective views of an example main membrane assembly including a switch and bobbin.

As illustrated in FIG. 6, the dual scroll assembly 110 is arranged such that the first portion 144 of the nozzle 142 and the second portion 148 of the nozzle 142 are arranged in vertical alignment. Moreover, the nozzle 142 extends orthogonally to a direction that air flows through the first scroll channel 136 and the second scroll channel 138. Thus, the first bypass 146 and the second bypass 150 allow the air traveling through the nozzle 142 to divert into the first scroll channel 136 and the second scroll channel 138, respectively. FIG. 7 illustrates an example embodiment of the main membrane assembly 108 having the membrane 130, a switch 154 and a bobbin 156. Referring briefly to FIGS. 3 and 6 in combination, the lower cover 114 of the housing 106 can be placed onto a circumferential lip 158 extending around the main membrane assembly 108. The membrane 130 is aligned with and can extend through the lower cover port 122 of the lower cover 114.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A dual-tone horn for a vehicle, comprising:
a nozzle configured to receive air, wherein the nozzle comprises a first portion comprising a first diameter and a second portion comprising a second diameter which is different than the first diameter;
a first scroll channel configured to receive air from the first portion to produce a first tone at a first frequency;
a second scroll channel configured to receive air from the second portion to produce a second tone at a second frequency;
a trumpet configured to emit a dyad created by a combination of the first tone and the second tone; and
a membrane for driving the air to the nozzle, the first scroll channel, and the second scroll channel,
wherein the membrane, the first portion, and the second portion are vertically aligned, and wherein the air travels through the first portion before entering the second portion.

2. The dual-tone horn according to claim 1, wherein the trumpet and a lower cover cooperate to form a housing.

3. The dual-tone horn according to claim 1, wherein a ratio of the first diameter and the second diameter is approximately 4:5 or 5:4.

4. The dual-tone horn according to claim 1, wherein the first frequency is approximately 400 Hertz and the second frequency is approximately 500 Hertz.

5. The dual-tone horn according to claim 1, wherein the first portion has a first bypass that is configured to deliver air to the first scroll channel, and wherein the second portion has a second bypass that is configured to deliver air to the second scroll channel.

6. The dual-tone horn according to claim 1, further comprising divider plate disposed between the first scroll channel and the second scroll channel.

7. The dual-tone horn according to claim 6, wherein a membrane is spaced apart from the first scroll channel and the divider plate to form a plenum.

8. A dual scroll assembly for a vehicle, comprising:
a nozzle having a first portion that has a first diameter and a second portion that has a second diameter, wherein the first diameter and the second diameter are different sizes;
a first scroll channel configured to receive air from the first portion of the nozzle, wherein the air traveling through the first scroll channel produces a first tone at a first frequency;
a second scroll channel configured to receive air from the second portion of the nozzle, wherein the air traveling through the second scroll channel produces a second tone at a second frequency, wherein the first tone and the second tone produce a dyad; and a membrane for driving the air to the nozzle, the first scroll channel, and the second scroll channel, wherein the membrane, the first portion, and the second portion are vertically aligned, and wherein the air travels through the first portion before entering the second portion.

9. The dual scroll assembly according to claim 8, wherein a ratio of the first diameter and the second diameter is approximately 4:5 or 5:4.

10. The dual scroll assembly according to claim 8, wherein the first frequency is approximately 400 Hertz and the second frequency is approximately 500 Hertz.

11. The dual scroll assembly according to claim 8, further comprising an upper cover and a lower cover, wherein the dual scroll assembly is disposed within a cavity created by the upper cover and the lower cover.

12. The dual scroll assembly according to claim 11, wherein the upper cover and the lower cover cooperate to form a trumpet that emits the first tone and the second tone.

13. The dual scroll assembly according to claim 8, wherein the membrane is disposed below the first scroll channel.

14. The dual scroll assembly according to claim 13, wherein the membrane is spaced apart from the first scroll channel to form a main plenum.

15. The dual scroll assembly according to claim 14, further comprising a switch within the membrane.

16. The dual scroll assembly according to claim 15, further comprising a bobbin within the membrane.

17. The dual scroll assembly according to claim 8, wherein the first portion has a first bypass configured to deliver the air to the first scroll channel, and wherein the second portion has a second bypass configured to deliver the air to the second scroll channel.

18. The dual scroll assembly according to claim 17, wherein the second scroll channel is covered by an upper cover.

\* \* \* \* \*